(12) United States Patent
Ludlam

(10) Patent No.: US 10,853,714 B2
(45) Date of Patent: Dec. 1, 2020

(54) WRITING DATA TO PRINTED MATTER WITH EMBEDDED WIRELESS DEVICES

(71) Applicant: MOO PRINT LIMITED, London (GB)

(72) Inventor: Nick Ludlam, London (GB)

(73) Assignee: MOO PRINT LIMITED, London (GB)

(*) Notice: Subject to any disclaimer, the term of this patent is extended or adjusted under 35 U.S.C. 154(b) by 0 days.

(21) Appl. No.: 16/329,698

(22) PCT Filed: Aug. 29, 2017

(86) PCT No.: PCT/GB2017/052523
§ 371 (c)(1),
(2) Date: Feb. 28, 2019

(87) PCT Pub. No.: WO2018/042169
PCT Pub. Date: Mar. 8, 2018

(65) Prior Publication Data
US 2019/0197379 A1    Jun. 27, 2019

(30) Foreign Application Priority Data
Aug. 31, 2016 (GB) .................................. 1614748.0

(51) Int. Cl.
G06K 7/08 (2006.01)
G06K 19/06 (2006.01)
(Continued)

(52) U.S. Cl.
CPC ........... G06K 19/072 (2013.01); B42D 15/02 (2013.01); G06K 7/0095 (2013.01);
(Continued)

(58) Field of Classification Search
USPC ........................................ 235/380, 451, 492
See application file for complete search history.

(56) References Cited

U.S. PATENT DOCUMENTS 5,936,420 A    8/1999  Sotokubo
5,960,082 A *  9/1999  Haenel ............... G06Q 20/3552
                                               235/492
(Continued)

FOREIGN PATENT DOCUMENTS

CN    204009990 U    12/2014
CN    204117184 U     1/2015
(Continued)

OTHER PUBLICATIONS

GB Search Report dated Feb. 23, 2017 as received in Application No. GB1614748.0.

*Primary Examiner* — Tuyen K Vo
(74) *Attorney, Agent, or Firm* — Maschoff Brennan

(57) ABSTRACT

A method of calibrating a digital data writing system (20), the digital data writing system comprising a plurality of wireless communication devices (30) configured to write digital data to a first plurality of wireless communication chips (7) provided in a printed sheet (10), the method comprising: providing, to the digital data writing system (20), configuration data relating to the locations of each of the first plurality of wireless communications chips (7); selecting each wireless communication device (30) in turn and identifying, for the selected wireless communication device (30), a corresponding one of the first plurality of wireless communication chips (7) that is located in closest proximity to the location of the wireless communication device (30) within the digital data writing apparatus (20); and determining, for the selected wireless communication device (30), the relative location of the device within the digital data writing system (20).

10 Claims, 6 Drawing Sheets

(51) Int. Cl.
*G06K 19/07* (2006.01)
*G06K 7/00* (2006.01)
*B42D 15/02* (2006.01)
*G06K 7/10* (2006.01)
*G06K 19/077* (2006.01)
*H04B 5/00* (2006.01)

(52) U.S. Cl.
CPC ..... *G06K 7/10237* (2013.01); *G06K 19/0722* (2013.01); *G06K 19/0723* (2013.01); *G06K 19/07718* (2013.01); *H04B 5/0031* (2013.01)

(56) References Cited

U.S. PATENT DOCUMENTS

| | | | |
|---|---|---|---|
| 2006/0132569 A1 | 6/2006 | Misumi | |
| 2006/0226983 A1 | 10/2006 | Forster et al. | |
| 2006/0237536 A1* | 10/2006 | Shiigi | G06K 7/10336 235/439 |
| 2007/0075132 A1* | 4/2007 | Kean | G07F 7/1008 235/380 |
| 2007/0159352 A1* | 7/2007 | Sahashi | F16C 19/184 340/870.07 |
| 2007/0164119 A1* | 7/2007 | Liu | G06K 19/0723 235/492 |
| 2010/0214592 A1* | 8/2010 | Muroi | B41J 3/50 358/1.14 |
| 2011/0018689 A1* | 1/2011 | McAllister | G06K 19/07758 340/10.1 |
| 2011/0227326 A1 | 9/2011 | Elgar et al. | |
| 2012/0256732 A1* | 10/2012 | McAllister | G06K 19/077 340/10.2 |
| 2013/0161382 A1* | 6/2013 | Bauer | G06K 17/0025 235/375 |
| 2013/0234837 A1 | 9/2013 | Li et al. | |
| 2016/0059532 A1 | 3/2016 | Thorogood | |
| 2016/0121623 A1 | 5/2016 | Celante et al. | |

FOREIGN PATENT DOCUMENTS

| | | |
|---|---|---|
| EP | 3 093 797 A1 | 11/2016 |
| WO | 2014/167344 A2 | 10/2014 |
| WO | 2015/141022 A1 | 9/2015 |

* cited by examiner

WRITING DATA TO PRINTED MATTER WITH EMBEDDED WIRELESS DEVICES

FIELD OF THE INVENTION

The present invention relates to improvements in the production of printed matter with embedded wireless devices and particularly, but not exclusively, to a system and method for calibrating a digital data writing system, as well as a system and method for bulk writing of digital data to wireless communication devices comprised within business cards.

BACKGROUND OF THE INVENTION

The Applicant has devised customisable paper business cards incorporating wireless communication chips (in particular, Near Field Communication or NFC chips). Digital information chosen by and specific to a particular customer is written to the NFC chip or tag in each business card. This digital information can be quickly and easily accessed, by someone to whom the business card is presented, utilising the NFC capabilities of that person's mobile device. Specifically, a user presented with an NFC-enabled business card containing an NFC tag or chip may bring his/her own user device (e.g. a smartphone with NFC capabilities) into contact with the business card, so as to facilitate transfer of the digital data stored in the NFC tag or chip to the user device. Such NFC-enabled business cards may be produced in large volumes, and retain all of the practical advantages associated with standard business cards whilst simultaneously providing enhanced user-interaction capabilities.

A system and method for printing and producing NFC-enabled business cards using a digital press is described in the Applicant's earlier application WO 2014/167344. In that application, it was envisaged that multiple NFC-enabled business cards would be produced in a single printed sheet, with the printed sheet comprising a bonded sheet pair with NFC tags/chips sandwiched between them. Several such printed sheets would be stacked together and vertical cuts would be made at predetermined locations through the stack of sheets in order to produce multiple stacks of business cards, each stack comprising a set of business cards destined for use by a particular customer. Each business card could have a particular print design (selected by the customer), and each print design would correspond to a certain set of properties and user-interaction capabilities of that particular business card. For example, a card with a first print design pattern may comprise digital data which would allow the user to obtain a URL link to the card owner's commercial website; a card with a second print design pattern may comprise digital data allowing the user to obtain a URL link to a website containing a promotional video uploaded by the card owner.

It is against this background that the present invention has been devised.

SUMMARY OF INVENTION

According to an embodiment of the present invention, there is provided a method of writing digital data to a plurality of business cards provided on a single printed sheet, each business card comprising a wireless communication chip to which digital data is written. The method comprises determining relevant pieces of digital data corresponding to the printed sheet; writing the relevant digital data to each of the wireless communication chips using a plurality of wireless communication devices. The method also comprises testing each wireless communication chip to determine if there are any inactive wireless communication chips for which the digital data was not successfully written to the wireless communication chip and enabling positive visual identification of the inactive wireless communication chips.

Advantageously, the ability to automate the positive visual identification of the presence of any inactive wireless communication chips (i.e. those for which the digital data writing step was unsuccessful) allows the quick and easy determination of those business cards which require re-printing and re-writing.

Optionally, determining relevant pieces of digital data comprises providing a sheet identifier corresponding to the printed sheet, the sheet identifier being associated with information relating to the digital data that is intended to be written to each wireless communication chip.

The sheet identifier may comprise a barcode or a QR code arranged to be read by an identification code reader.

Optionally, the writing step further comprises transmitting, to a remote server, the sheet identifier, and retrieving, from the remote server, the pieces of digital data and the identity of the associated business card which corresponds to each piece of digital data. The writing step may further comprise providing each piece of digital data to a respective wireless communication device which has a first location associated with it, the first location corresponding to a second location of the associated wireless communication chip within the printed sheet.

Optionally, testing each wireless communication chip comprises attempting to read the digital data comprised in each wireless communication chip.

In some embodiments, the wireless communication device that was used to write the digital data to the wireless communication chip may be used to carry out the testing. Alternatively, a separate wireless communication device may be used to carry out the testing.

Optionally, enabling positive visual identification of any inactive wireless communication chips comprises one of the following: (a) illuminating one or more positions on the printed sheet where an inactive wireless communication chip is located; (b) illuminating one or more positions on the printed sheet where an active wireless communication chip is located, or (c) illuminating all positions on the printed sheet where a wireless communication chip is located, the illumination type differing between positions with and without an inactive wireless communication chip.

Optionally, writing digital data comprises transferring digital data from each wireless communication device to the corresponding wireless communication chip using Near-Field Communication (NFC) technology. Each wireless communication chip may comprise a passive NFC chip or tag, and each wireless communication device may comprise an active NFC device.

In some embodiments, each of the wireless communication chips is associated with a unique chip identifier, and the chip identifier is associated, in a database, with the digital data written to the corresponding wireless communication chip for subsequent retrieval.

According to another embodiment of the present invention, there is provided a method of calibrating a digital data writing system, the digital data writing system comprising a plurality of wireless communication devices configured to write digital data to a first plurality of wireless communication chips provided in a printed sheet. The method comprises providing, to the digital data writing system, configuration data relating to the locations of each of the first plurality of wireless communication chips. The method further comprises selecting each wireless communication device in turn and identifying, for the selected wireless communication device, a corresponding one of the first plurality of wireless communication chips that is located in closest proximity to the location of the wireless communication device within the digital data writing apparatus. The method further comprises determining, for the selected wireless communication device, the relative location of the device within the digital data writing system.

Advantageously, the calibration of the digital data writing system and the association of each wireless communication devices with a correspondingly-located wireless communication chip allows the configuration of the digital data writing system to be altered to write data to more or fewer printed business cards, and to easily change the layout of the business cards within the printed sheet. This increases the flexibility of the digital data writing system.

Optionally, the method further comprises providing the digital data to be written to each of the first plurality of wireless communication chips to the correspondingly-located wireless communication device.

In some embodiments, providing configuration data comprises providing a system setup identifier associated with system configuration data, the system configuration data comprising instructions for determining the physical locations of the plurality of wireless communication devices in the digital data writing system. The system setup identifier may comprise a barcode or QR code in some cases.

Optionally, the system setup identifier is provided on a separate calibration sheet, and the calibration sheet also comprises a second plurality of calibration wireless communication chips, the calibration wireless communication chips being arranged in substantially the same configuration as the first plurality of wireless communication chips.

The step of determining the relative location of each wireless communication device may further comprise reading, by the selected wireless communication device, a data record stored in a correspondingly located one of the calibration wireless communication chips, the data record comprising a location indicator of the calibration wireless communication chip; and associating the location indicator with the selected wireless communication device.

In some cases, each wireless communication chip may comprise a passive NFC chip or tag, and each wireless communication device may comprise an active NFC device.

According to another embodiment of the present invention, there is provided a system for writing digital data to a plurality of printed business cards provided in a printed sheet, each business card comprising a wireless communication chip to which the digital data is written. The system comprises a digital data writing apparatus for writing digital data to the plurality of wireless communication chips; and an identification code reader arranged to receive information relating to the writing of the digital data. The system also comprises a projection apparatus arranged to enable positive visual identification of any inactive wireless communication chips for which digital data was not successfully written. The system further comprises a central processing unit arranged to control the writing of the digital data to the plurality of wireless communication chips. The digital data writing apparatus comprises a housing with a container and a flat upper surface, wherein the container is provided with a plurality of recesses, each recess being configured to receive one of a plurality of wireless communication devices, and the upper surface is arranged to receive a printed sheet so as to ensure close proximity between the wireless communication devices and the wireless communication chips.

Optionally, each wireless communication device comprises a device with active NFC read/write capabilities, and each wireless communication chip comprises a passive NFC chip with an associated antenna.

Optionally, the identification code reader comprises a device for reading a barcode or a QR code.

In some embodiments, the projection apparatus comprises a projector arranged above the digital data writing apparatus so as to illuminate specific locations on the printed sheet. The projector may be attached to a stabilising mount and arranged vertically above the digital data writing apparatus.

The system may further comprise a remote server and an associated database, in communication with a central processing unit via a communications network, for processing and storing digital data that is to be written to the printed sheet.

Optionally, the printed sheet comprises a sheet identifier arranged to be read by the identification code reader, the sheet identifier comprising instructions for retrieving the digital data for writing to the printed sheet.

According to another embodiment of the present invention, there is provided a calibration system for calibrating a digital data writing system, the digital data writing system comprising a plurality of wireless communication devices configured to write digital data to a first plurality of wireless communication chips provided in a printed sheet. The calibration system comprises an identification code reader for receiving configuration data relating to the plurality of wireless communication devices; and a calibration sheet comprising a second plurality of calibration wireless communication chips arranged in substantially the same configuration as the first plurality of wireless communication devices. Optionally, each of the calibration wireless communication chips comprises a data record containing a location indicator of the calibration wireless communication chip; and each wireless communication device is configured to extract the location indicator of a correspondingly located calibration wireless communication chip. The calibration system may be configured to associate each wireless communication device with the location indicator of the respective correspondingly located calibration wireless chip.

Optionally, the calibration sheet comprises a system setup identifier arranged to be read by the identification code reader, the system setup identifier comprising information relating to the configuration of the plurality of calibration wireless communication chips.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF FIGURES

One or more embodiments of the invention will now be described, by way of example only, with reference to the accompanying drawings, in which.

DETAILED DESCRIPTION OF SPECIFIC EMBODIMENTS

The following description sets out specific non-limiting embodiments of the present invention.

Figure 1:
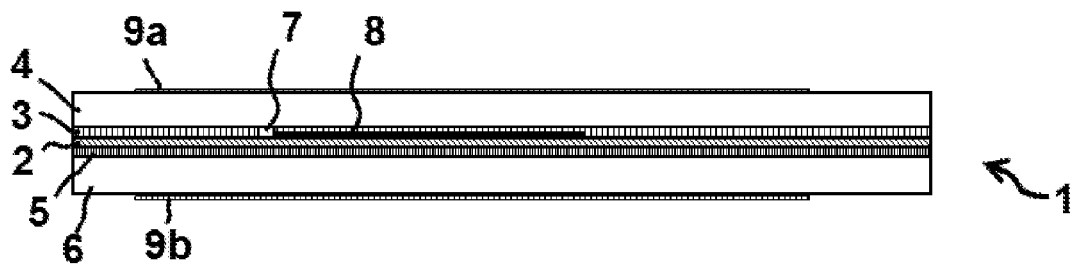
FIG. 1 is a schematic diagram of the cross-sectional structure of a business card with wireless communication capabilities illustrating the context in which the present invention is used.

FIG. 1 shows a cross-sectional schematic view of a printed business card to illustrate the context in which the present invention is used. The business card 1 comprises a first paper stock 4, a second paper stock 6, a PET substrate layer 2, a wireless communication chip 7 and its corresponding antenna 8. The first and second paper stocks 4, 6 support print 9a, 9b on their respective outwardly-facing surfaces. The first paper stock 4 and the substrate layer 2 are bonded together via a first adhesive layer 3, and the substrate layer 2 and the second paper stock 6 are bonded by a pressure-activated adhesive 5. Further details relating to the printed business card and its production are described in the Applicant's previous application WO 2014/167344. The disclosure of this prior application is incorporated by reference herein to the extent permitted by applicable law. While the embodiments as described below relate to business cards (implying a particular form factor), the person skilled in the art will appreciate that the teaching provided here may relate to paper products of similar form factor but different purpose (such as travel tickets) or to paper products with the same structure but possibly of a different form factor (for example, card wallets formed by folding an area of card sheet).

In general, business cards of the type shown in FIG. 1 are produced in batches from rolls of material, which are processed and divided into smaller printing sheets. These sheets are then run through a digital press for printing, combined and then subdivided into business cards 1, each business card 1 supporting a single wireless communication chip 7.

In order to produce these wireless-enabled business cards in bulk, the Applicant utilises a system that mainly comprises Off-the-Shelf or commodity hardware components, which are relatively inexpensive compared to custom-designed components. Although this decreases the associated start-up costs, challenges can arise where the commodity hardware has not been rigorously quality-checked; it may also be necessary to custom-modify the commodity hardware to provide the capabilities for bulk writing digital data to multiple wireless communication chips. To increase the efficiency of the production process, there is also a need to quickly and easily identify any wireless communication chips for which the writing of digital data was unsuccessful, so as to prevent any non-functioning business cards being provided to the customer.

Furthermore, it is important that the process of writing digital data to the wireless communication chips is easily adaptable—for example, it may sometimes be necessary for different numbers and/or layouts of business cards to be provided on each printed sheet, and it would be useful if the system utilised could easily adapt to these differing requirements without necessitating a lengthy time lag for re-calibration of the digital data writing apparatus. The ability to easily vary the number of wireless communication chips that are written to, as well as their locations in the printed sheets, ensures the flexibility of wireless-enabled business card production to suit the changing needs of the customer.

Figure 2:
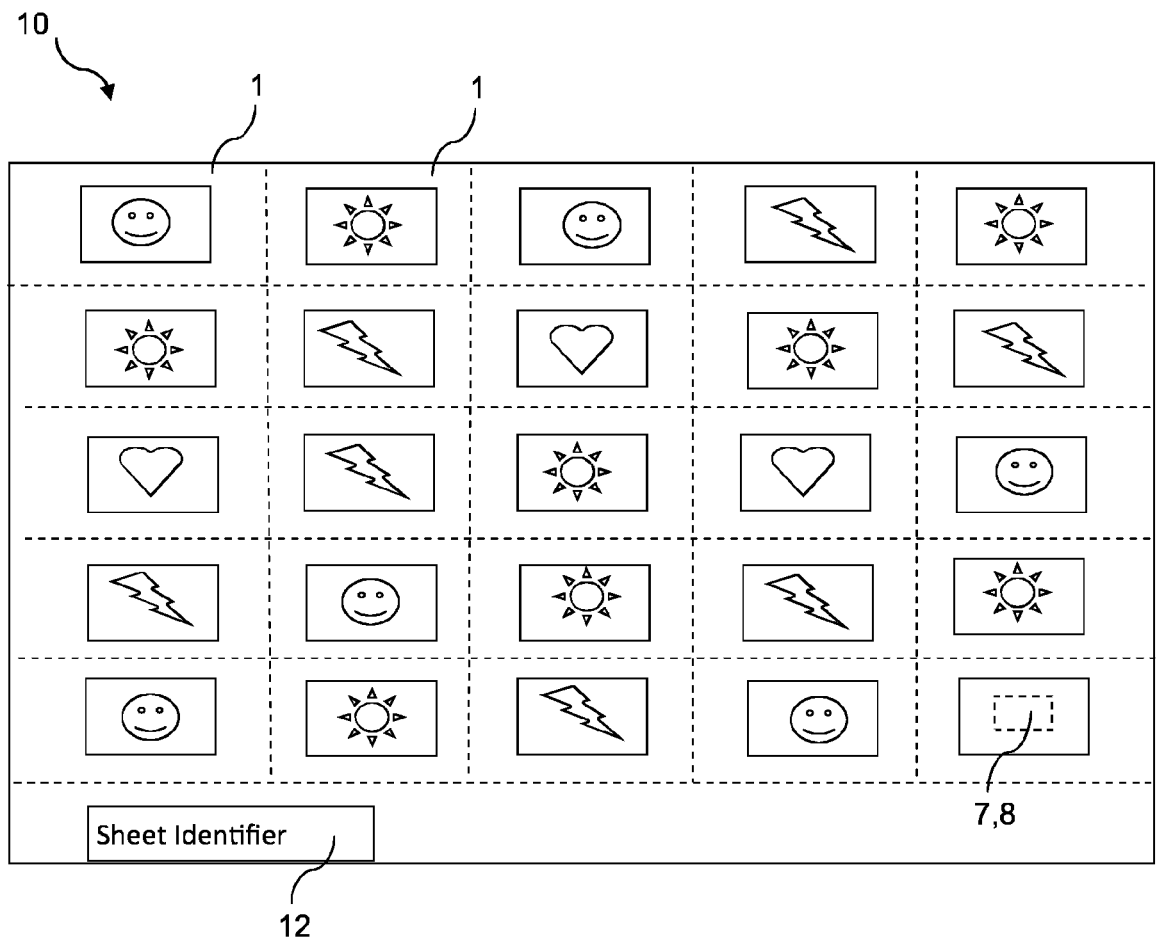
FIG. 2 is a schematic diagram showing an example layout of a printed sheet comprising a plurality of the business cards of FIG. 1, according to an embodiment of the present invention.

An example of a printed sheet 10 comprising a plurality of business cards 1 according to an embodiment of the present invention is shown in FIG. 2. The printed sheet 10 comprises a 5×5 arrangement of business cards 1, with dotted lines indicating how the printed sheet is to be sub-divided subsequently into individual business cards. Each card has a certain printed design pattern on it which may correspond to a particular form of digital data that is to be written to the wireless communication chip 7, and will aid the visual identification of the content of the business card by a user. The dotted square on the bottom right-most business card of the figure is intended to be indicative of the presence of the wireless communication chip 7 and antenna 8 contained within each business card.

It will be understood by the skilled person that the 5×5 arrangement of business cards shown in the printed sheet of FIG. 2 is for illustrative purposes only, and that many alternative layouts and configurations of business cards within a printed sheet may be used without departing from the scope of the present invention.

The printed sheet further comprises a sheet identifier 12 printed on a portion of the printed sheet that is not intended to form part of a business card. The sheet identifier 12 is associated with data relating to the properties of the sheet on which it is printed, and particularly to the form of the digital data that is intended to be written to each business card in the sheet, where the data is stored and how it may be retrieved. In addition, as will be described later, the sheet identifier 12 may also provide information regarding the specific locations on the printed sheet that different pieces of digital data are intended to be written to, and hence (indirectly) the location of the NFC device which should be provided with a particular set of data. In one embodiment, the sheet identifier 12 may take the form of a barcode or a QR code which is scanned and read by a digital reader to obtain the requisite information contained therein.

Figure 3:
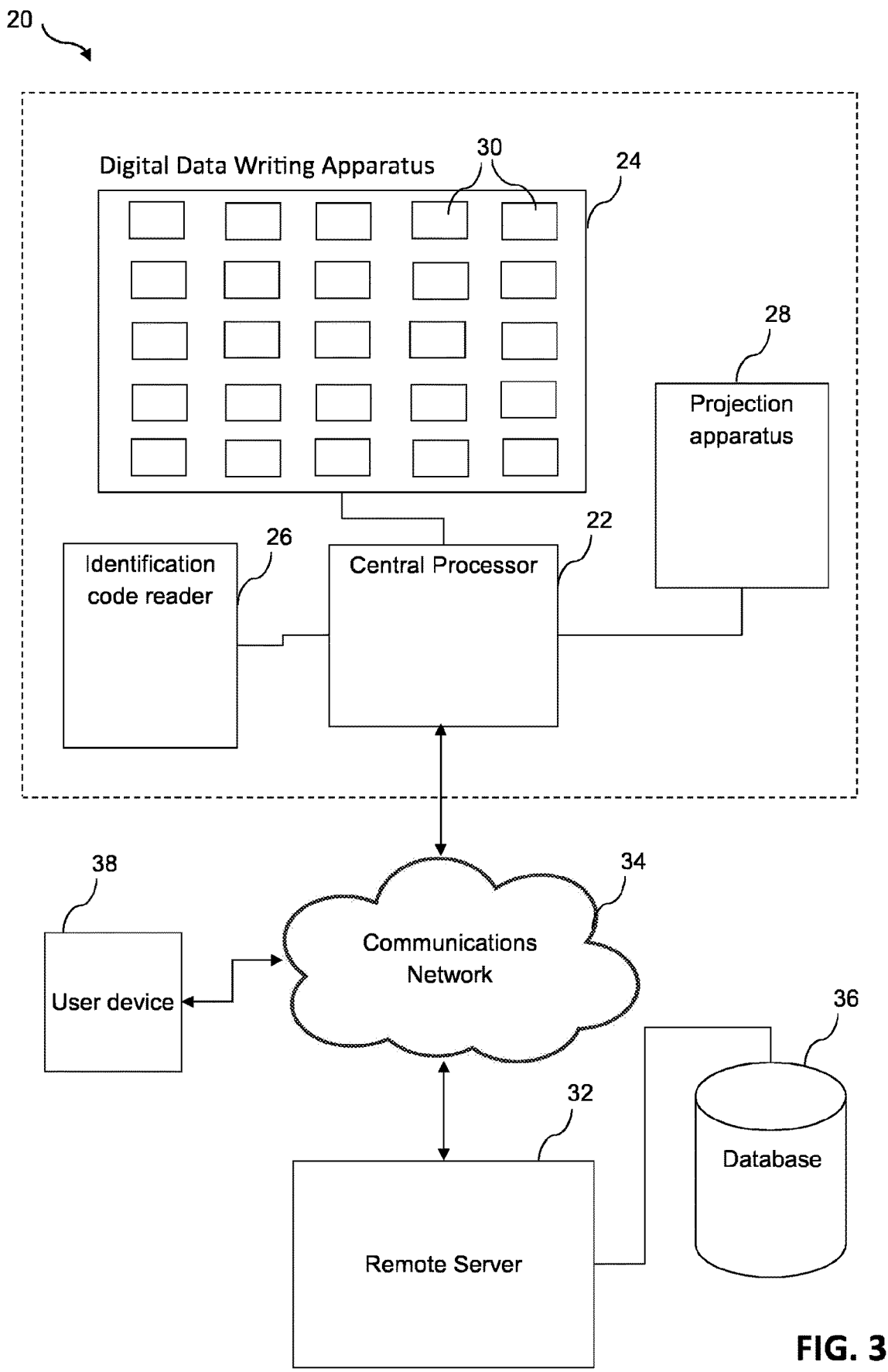
FIG. 3 is a schematic block diagram of an exemplary system according to an embodiment of the present invention.

FIG. 3 is a schematic block diagram of a system 20 used to write digital data to a plurality of business cards in accordance with an embodiment of the present invention. In this (and all following) illustrated embodiments, the wireless communication technology employed will be assumed to be NFC communication, and the wireless communication devices and chips will hereafter be referred to as NFC devices and chips respectively. However, as the skilled person will appreciate, other wireless communication technologies (such as Bluetooth) could in principle be employed. Furthermore, although for simplicity the description refers almost exclusively to 'NFC chips', it should be appreciated that this term may be used interchangeably with 'NFC tags' and it will be understood that both these terms are equivalent to the aforementioned wireless communication chip 7 which is attached to a corresponding antenna 8, even if these are omitted in the subsequent description and figures In addition, although the term 'NFC tag' may occasionally be used in the art to refer to an entirely passive NFC device, it should be understood that in the context of the present invention this term should be interpreted fairly broadly and should not preclude NFC devices that include associated in-built logic allowing more complex processes than simple read/write functions to be carried out.

Turning to a description of FIG. 3, the system 20 comprises a central processor 22 in operative communication with a digital data writing apparatus 24, an identification code reader 26 and a projection apparatus 28. The digital data writing apparatus 24 comprises a plurality of NFC devices 30, each of which is located in a position that corresponds to one of the NFC chips contained within the printed sheets that are provided to the digital data writing apparatus. The projection apparatus 28 is positioned close to the digital data writing apparatus 24, and is configured to enable the positive visual identification of any inactive NFC chips after a digital data writing step has been carried out. Additional details of the digital data writing apparatus 24 and the projection apparatus 28 will be provided later with reference to FIG. 4. The identification code reader 26 is arranged to read the sheet identifier 12 provided on each of the printed sheets, and may for example comprise a barcode scanner or a QR code reader, depending on the exact form taken by the sheet identifier.

The central processor 22 also communicates with a remote server 32 via a communication network 34 (e.g. a network cable, wireless network etc.). It should be noted that although all the components required for all embodiments are included in this figure, not all of the components are required for every embodiment envisaged.

The central processor 22 of the present embodiment corresponds to a single board computer (for example, a Raspberry Pi computer) which handles all of the interactions between the projection apparatus 28, the digital writing apparatus 24 and the identification code reader 26, as well as data exchange between these components and the remote server 32.

The remote server 32 comprises or is associated with a database 36 storing customer information. This information comprises the customer-specific data that is intended for provision to each of the business cards 1, which the customer has previously provided to the system operator via a user device 38. For example, in an early customer registration and data provision phase carried out prior to the printing of each business card, the customer is able to choose from a selection of printed design patterns for their business cards, and associate each chosen print pattern with a specific piece of digital data; the submission of data may be carried out by the customer from their user device 38 (i.e. by filling in a form provided on a website associated with the present system). This customer information is then transmitted to the remote server 32 via the communications network 34 and stored in the database 36. The database 36 may also comprise stored system configuration information relating to the positions of the NFC devices 30 that are utilised in different print layouts or configurations. This stored data may be retrieved and used in a calibration step carried out prior to the writing of digital data (which will be described in greater detail later with reference to FIG. 6).

In use, the sheet identifier 12 of the printed sheet 10 is read by the identification code reader 26, and the data in the sheet identifier is extracted for provision to the remote server 32 by the central processor 22 (via the communications network). Upon receipt of the sheet identifier data, the remote server 32 retrieves stored information from the database 36 that is associated with the sheet identifier 12—this information includes the location of each business card 1 within the printed sheet 10, as well as the associated customer details and the digital data that is intended to be written to each business card 1. The association between the sheet identifier 12 and the information that is intended to be written to each NFC chip 7 in the printed sheet will be described later in greater detail with reference to FIG. 5.

The retrieved digital data is transmitted back from the remote server 32 to the central processor 22 and passed to the digital data writing apparatus 24. Specifically, each piece of digital data is provided to the NFC device 30 that has been identified as corresponding to the NFC chip 7 to which the digital data is to be written (e.g. the NFC device located in closest proximity to the relevant NFC chip). Each NFC device 30 subsequently writes the requisite pieces of digital data to the corresponding NFC chip 7 in the printed sheet 10, and the central processor 22 then transmits a command to the projection apparatus 24 to check if all the NFC chips 7 have been successfully written to. The digital data writing process for that particular printed sheet 10 is then deemed to be complete.

Figure 4:
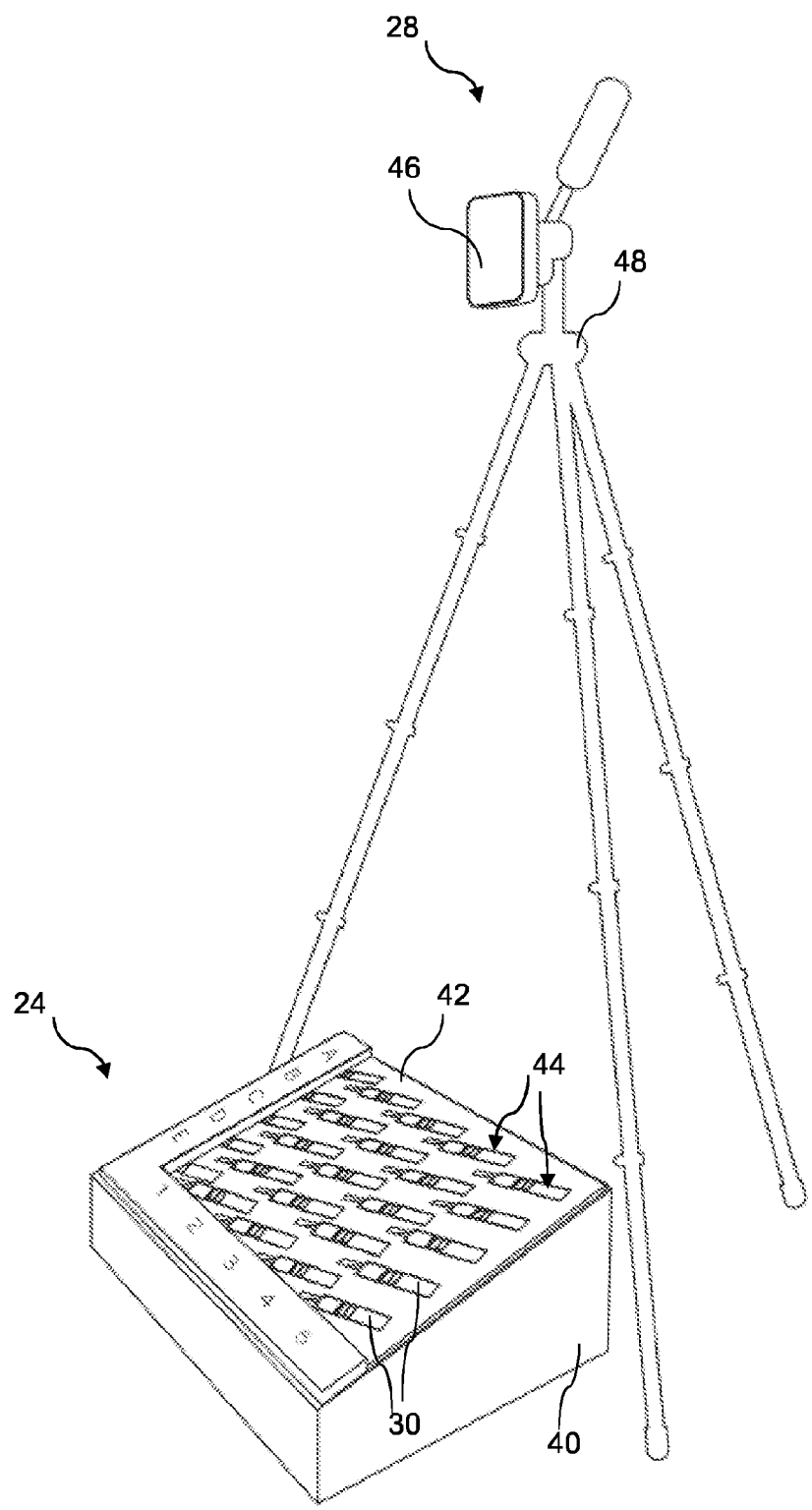
FIG. 4 is a block diagram showing further details of the projection apparatus and digital data writing apparatus of the embodiment of FIG. 3.

Turning to FIG. 4, the digital data writing apparatus 24 comprises a container or housing 40, on an upper surface 42 of which are provided a plurality of recesses, each of which is configured to receive one of a plurality of NFC devices 30 with active NFC communication capabilities (e.g. USB devices connected to circuit boards which are able to read and write using NFC technology). The NFC devices 30 are therefore positioned at or close to an upper surface of the housing 40 upon which the printed sheet 10 is to be placed. Due to the inductive coupling that is required for NFC reading and writing, typical operating ranges that are required for effective NFC communication are a few centimetres (and certainly less than 10 cm), and it is therefore an important consideration for the NFC chips 7 in the printed sheet 10 and the NFC devices 30 in the housing 40 to be brought into as close proximity as possible. Based on the above-described design, the housing 40 is able to ensure that the NFC devices 30 are housed and retained securely whilst simultaneously ensuring that the circuit boards of each NFC device 30 are brought substantially flush with the surface upon which the printed sheets 10 will rest, thereby ensuring good inductive contact and close proximity between NFC devices 30 and the NFC chips 7 to which digital data is being written. It is also noted that by using NFC technologies for writing digital data to business cards, due to the short effective range of such technologies, it is possible to have the devices located in close proximity to one another (around 10 cm between NFC writing devices), without the risk of accidentally writing the digital data to the wrong NFC chip. The digital data writing apparatus 24 therefore can be fairly compact and of a manageable size to manually reposition easily.

The projection apparatus 28 of the present embodiment (also shown in FIG. 4) comprises a standard (hand-held) projector device 46 which is mounted using a tripod 48 above the digital data writing apparatus 24. The projector 46 is arranged and configured to selectively illuminate portions of a printed sheet 10 resting on an upper surface of the digital data writing apparatus 24, so as to allow visual identification of any business cards for which the writing of digital data was unsuccessful (for example, due to a faulty coupling between the NFC device 30 and NFC chip 7, or because of an inherently non-functional NFC chip).

In the illustrated embodiment, the projector 46 corresponds to a standard off-the-shelf pico-projector that is programmed and calibrated by the system operator prior to use, so as to define the positions of each of the NFC chips 7 that are to be illuminated. This pre-programming is carried out using what is effectively a keystoning process. Specifically, the system operator calibrates an operating system of the projector 46 to designate a pixel on the bottom right-hand side of the projector image to correspond to the NFC chip that will be positioned in the bottom right-hand corner of the digital data writing apparatus (i.e. in the position E5 shown in FIG. 4). Based on this initial definition, and using positional information about the grid of NFC chips 7 (for example, the number of rows of columns in the grid, as well as the distance between neighbouring NFC chips), the system operator is able to define physical positions of the digital data writing apparatus 24 that are to be illuminated, and the size of the illuminated spots.

The projector is therefore able to project spots of visible light onto positions on the printed sheet 10 (as it rests on top of the container or housing 40) which correspond to the location of each NFC chip 7. The particular NFC chips that are selected for illumination, as well as the properties of the illuminated light (for example, the colour and duration of illumination) are dependent on the properties of the NFC chips.

In one embodiment, the projector 46 is programmed to be operable in one of two modes—a 'passive' mode and an 'active' mode. The passive mode is generally utilised in an initial pre-writing stage, for example, where the system 20 is simply attempting to detect the presence of writable NFC chips 7 within a printed sheet 10. In this embodiment, the projector 46 intermittently illuminates only those NFC chips 7 which have not been successfully detected as being writable—such spots of flashing light at the corresponding positions on the printed sheet 10 swiftly alert the system operator to the locations of malfunctioning hardware. The active mode, on the other hand, is generally utilised in a post-write testing stage, to determine if a successful write has occurred for all the NFC chips 7 in a particular printed sheet 10. In this mode, those locations on the printed sheet 10 which correspond to a successfully written NFC chip 7 are continuously illuminated with a coloured light spot (for example, a green spot) whilst those locations corresponding to an NFC chip for which the digital data writing process has failed are illuminated intermittently with a light spot of a different, contrasting colour (for example, white or red). The combination of the colour contrast, as well as the rapid change between minimum and maximum light levels allows for optimal visual distinction between functioning and non-functioning NFC chips. This feature therefore allows a system operator to quickly and easily ascertain visually if there are any inactive or faulty business cards which will need to be replaced and/or re-programmed before the business cards are sent out to the customer.

In some instances, the system is programmed to attempt to write the digital data to a particular NFC chip a certain number of times. For example, the digital data writing apparatus may be programmed to carry out a maximum of three successive write attempts to an NFC chip 7, and if the data is still unable to be written after the third successive failure, the writing process for that chip will be aborted. The use of the projector 46 allows multiple write attempts to be visually documented in real time whilst they are occurring. For example, the projector 46 may illuminate an NFC chip 7 with a particular colour (such as purple) if it is in the process of trying (and failing) to write the digital data to it; however, once the third successive failure has occurred or the chip has been successfully written to, the projector 46 will revert to the form of illumination described earlier to signal an ultimate failure or a successful write as appropriate.

It will be appreciated by the skilled person that the specific properties of the projected light that have been described above for this particular embodiment may be varied depending on user preference and necessity. For example, different colours of light and duration or types of illumination may be used to differentiate between the functioning and non-functioning NFC chips. Such changes would constitute minor design variations and are also deemed to fall within the scope of the present invention.

Methods of producing customised NFC-enabled business cards according to embodiments of the present invention will now be described with reference to FIGS. 5 and 6.

Figure 5:
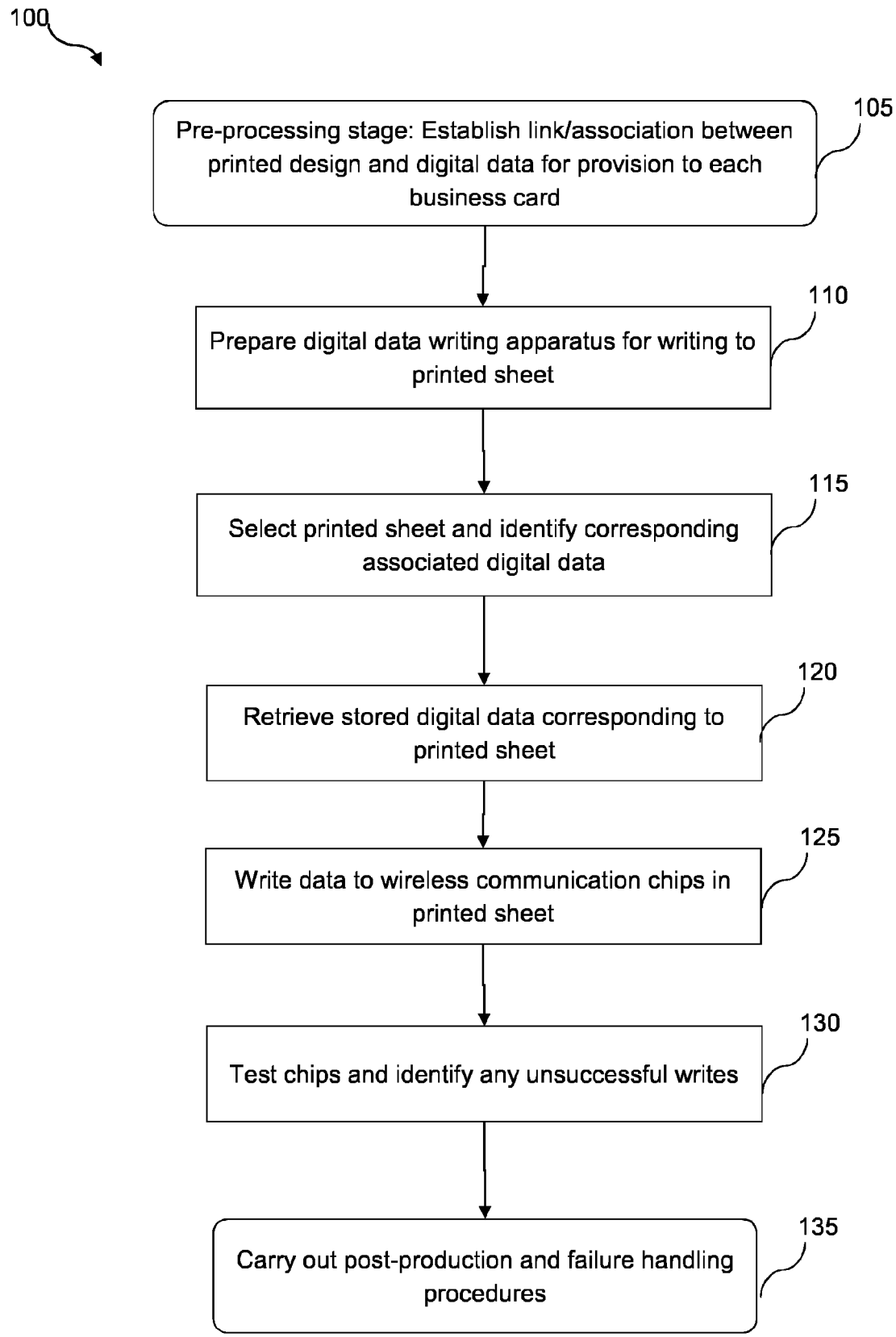
FIG. 5 is a flow diagram showing an overview of a method of writing digital data to a plurality of wireless communication device according to an embodiment of the present invention.

FIG. 5 shows a flow chart providing a high-level overview of the process 100 of producing customised business cards 1 containing digital data, according to an embodiment of the present invention. Prior to the start of the process, the printed sheets 10 must be produced—as this was described in some detail in the Applicant's previous application WO 2014/167344, this will not be discussed in detail here. However, one feature that will be expanded upon is that as part of a pre-processing stage 105 in which preparation of the printed sheets 10 is carried out, an association needs to be made between the digital data that is to be written to each NFC chip 7 in a particular printed sheet and the printed data of the corresponding business card 1 that will be provided on the printed sheet itself 10. In other words, each printed business card 1 must be linked to or somehow associated with the corresponding digital data that is to be written to the NFC chip 7 in that business card. This linkage between printed and digital data is facilitated by use of the sheet identifier 12.

Each NFC chip 7 may have a coordinate associated with it which identifies its location within the printed sheet. For example, in the printed sheet of FIG. 2, the NFC chip 7 located in the top left-hand corner of the sheet may be associated with the coordinate pair (1,1); the NFC chip 7 located in the top right-hand corner of the printed sheet may be associated with the coordinate pair (5,1); the NFC chip 7 in the bottom left-hand corner may be associated with the coordinate pair (1, 5), and so on. A sheet identifier 12 is generated for each printed sheet 10 corresponding to the following information for every business card that will be printed on the printed sheet:

(a) the location of the business card 1 within the printed sheet 10 (for example, the coordinate pair associated with the NFC chip 7 contained in that business card);

(b) the selected design pattern (and therefore the corresponding type of digital data); and (c) customer information (and hence the actual location within the database 36 from which the digital data that is intended to be written to that NFC chip 7 may be retrieved).

In some embodiments, (b) and (c) may already have been linked together within the database 36 (and retrieved as a single piece of data for input to the sheet identifier 12), based on the information provided by the customer during the pre-selection stage 105.

Each NFC chip 7 may also have a specific identifier or chip ID associated with it, and these chip IDs may also be contained within the sheet identifier 12 and may be stored in the database 36 along with the other information described above. Each chip ID is therefore effectively associated with the digital data that is intended to be written to it.

This generated sheet identifier 12 is stored in the database 36 together with a record of all of the data that is associated with that particular sheet identifier 12; the sheet identifier 12 is also provided on the corresponding printed sheet 10 (for example, in an encrypted format as a barcode or a QR code). When the sheet identifier 12 is subsequently read by the identification code reader 26 and provided to the remote server 32 by the central processor 22, the remote server 32 is able to match the received sheet identifier 12 with the corresponding stored sheet identifier, and automatically retrieve the requisite associated digital data for provision to the central processor 22.

Once the printed sheets have been produced (including carrying out the pre-processing stage described above), the digital data writing apparatus 24 is set up in Step 110 in preparation for writing digital data to the NFC chips 7 in the printed sheets 10. This may include carrying out an (optional) calibration step, which will be described in greater detail subsequently with reference to FIG. 6.

Once the digital data writing apparatus 24 has been set up, a system operator selects in Step 115 the printed sheet 10 that is to be written to, placing it in position on the upper surface 42 of the digital data writing apparatus 24 and uses the identification code reader 26 to read the sheet identifier 12 (e.g. the operator may use a barcode scanner to scan a barcode provided on the printed sheet). The information obtained from the sheet identifier 12 is sent from the central processor 22 to the remote server 32, which retrieves at Step 120 the associated pieces of digital data that are intended for provision to each business card 1 in the printed sheet 10.

The requisite digital data is then written in Step 125 to the NFC chips 7 of each business card 1 by the correspondingly-located NFC device 30. Once the writing step has been completed, tests are carried out in Step 130 to determine if all the available NFC chips 7 have been successfully written to, and if there are any inactive NFC chips in the current batch. Those cards which have been identified as containing inactive NFC chips are noted (and optionally may be marked visibly in some manner) and may subsequently be discarded during a final post-production phase (i.e. a step in which the printed sheets are stacked and the individual business cards are cut out). The system operator may also perform a check in Step 135 of the available (functional) business cards for each customer so as to ensure that there is redundancy in the business cards produced, and that each customer receives the requested number of business cards of each type in their final order. It will therefore be appreciated that an additional advantage that is provided by the association between the chip ID and the digital data that is to be written to that chip, is that any business cards which malfunction when in use by the customer may be restored to their original functionality by the system operator, or re-written to a new NFC chip in a replacement business card, as the chip ID may be used to identify the requisite data that should have been written to the malfunctioning card.

Figure 6:
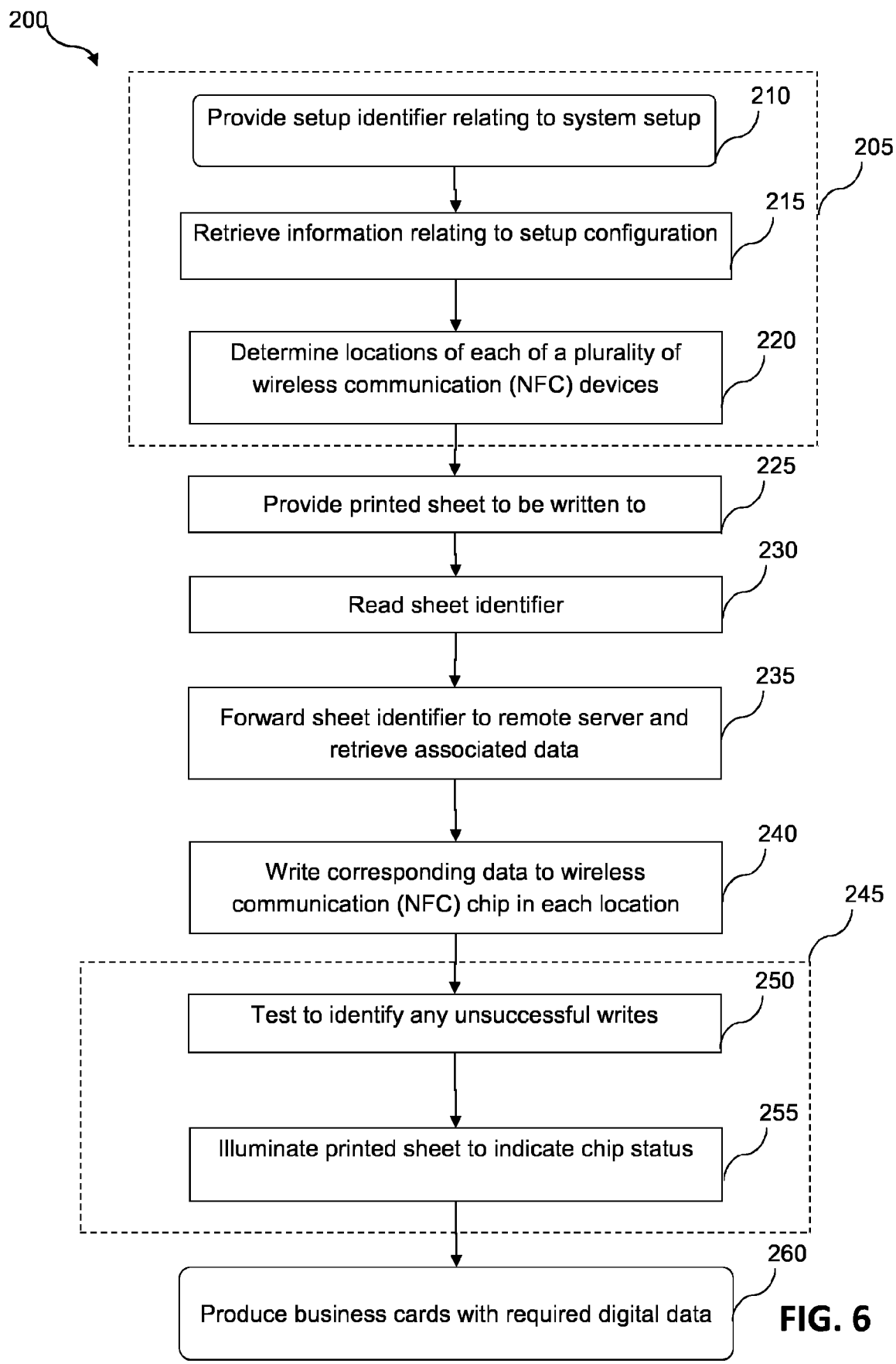
FIG. 6 is a flow diagram showing further details of the method of FIG. 5.

The flow chart of FIG. 6 provides a more detailed breakdown of the various steps that are required to carry out the method of FIG. 5.

The process 200 comprises an initial calibration phase 205, which is initiated by a first step of the system operator providing system configuration data to the central processor 22.

The system configuration data comprises one or more of the following pieces of information: (a) the number and layout of NFC chips 7 that are expected to be provided in the printed sheets 10 that will subsequently be written to; (b) the number and layout of NFC devices 30 that are currently provided in the digital data writing apparatus 24; and (c) the number of NFC devices 30 that are expected to be in use when writing to the intended printed sheet. In one embodiment, this involves the provision of a setup identifier 80 associated with the system configuration data to the central processor 22 in Step 210, which may be provided, for example, in the form of a barcode that is scanned by the system operator using the same barcode scanner which will subsequently be used to scan the sheet identifier 12 on the printed sheet 10.

Figure 7:
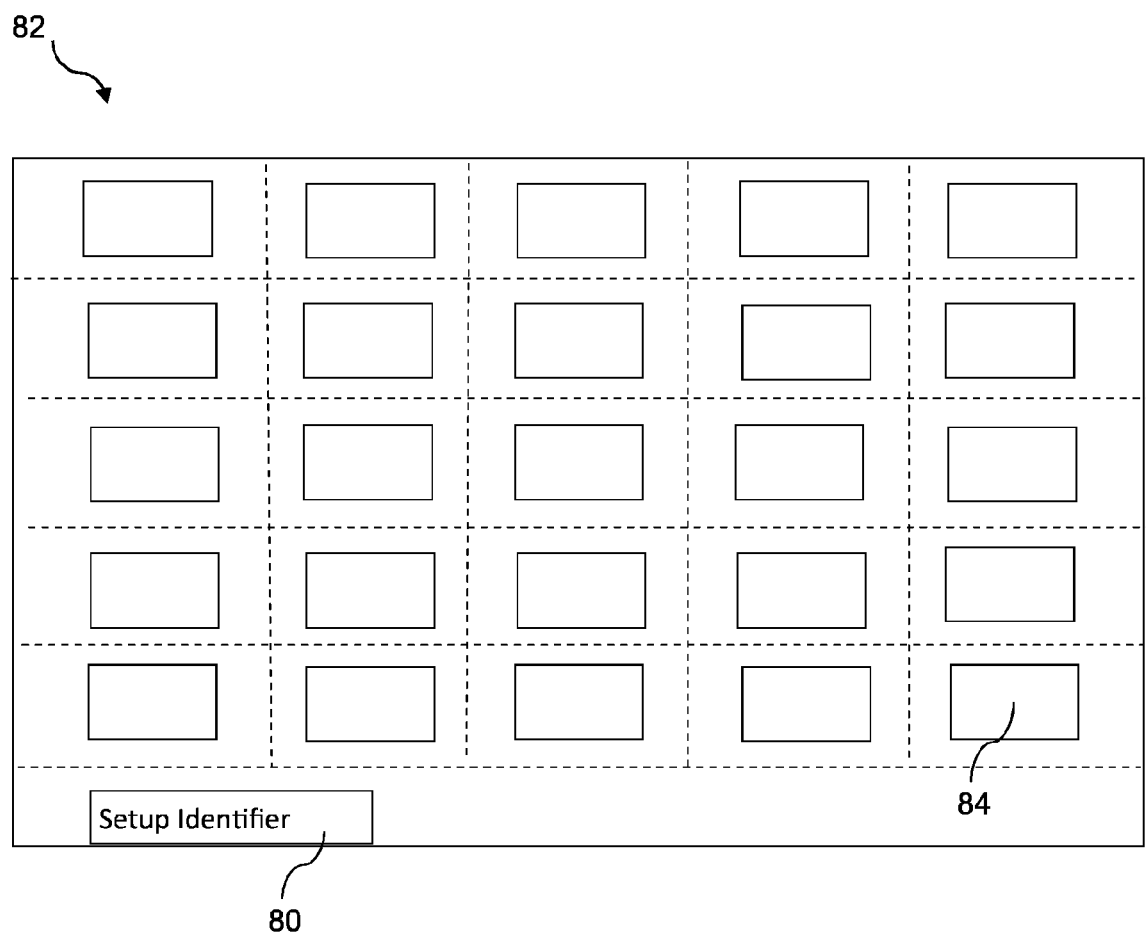
FIG. 7 is a schematic diagram showing an example layout of a calibration sheet used in a calibration phase according to an embodiment of the present invention.

In one embodiment, the setup identifier 80 is provided on a separate printed 'calibration sheet' 82, which is very similar in configuration and layout to the printed sheet 10 and is illustrated in FIG. 7. The calibration sheet 82 comprises a grid of 'calibration' NFC chips or tags 84 that are laid out such that their physical locations correspond substantially to the NFC chips 7 in the printed sheets 10 that will subsequently be written to. The setup identifier 80 in the calibration sheet 82 is analogous to the sheet identifier 12 for the printed sheet 10 and would most likely be provided in a corresponding or similar location on the calibration sheet 82, as may be seen in FIG. 7. In other embodiments, the setup identifier 80 may be provided on the digital data writing apparatus 24 itself. Alternatively or additionally, a list of setup identifiers 80 corresponding to different setup configurations of the digital data writing apparatus may be provided (separate from the digital data writing apparatus), and one of the listed setup identifiers may be selected for scanning by the system operator depending on the system setup configuration that is required.

Upon receiving the setup identifier 80, the central processor 22 retrieves at Step 215 at least a portion of the system configuration data corresponding to information piece (a), specifically, the number of NFC chips that are expected to be provided in the subsequent printed sheets, from an internal memory of the central processor 22, or from an associated data store of the central processor 22. The number of NFC devices that will need to be initialised by the system will correspond to the number of NFC chips that are expected to be present based on the setup identifier. The central processor will therefore know the expected number of NFC devices 30 that are expected to have been initialised by the end of the calibration phase 205.

In the embodiment in which a calibration sheet 82 is utilised, in addition to the above-described setup identifier 80, information regarding the relative location of each NFC chip in the calibration sheet 82 is also obtained in Step 215. Specifically, each NFC chip in the calibration sheet is pre-programmed and written with a text record that defines its position within the grid layout (for example, in the 5×5 grid of FIG. 3, the calibration NFC chips 84 are each allocated a location indicator from A1 to E5). Each NFC device 30 in the digital data writing apparatus is programmed (upon initialisation) to read the calibration NFC chip 84 which is in closest physical proximity to that NFC device 30 and to extract the positional data of that calibration NFC chip from the text record. This information will then be sent to the central processor 22, and that NFC device 30 will subsequently be associated with that location indicator (A1 to E5) until the system is shut down or re-calibrated. Due to the provision of the setup identifier 80 to the central processor 22, which identifies the total number of NFC chips that are expected to be present in subsequent printed (writable) sheets, the central processor 22 is aware of the expected number of NFC devices 30 that will need to extract and report positional data. Once the expected number of NFC devices 30 has extracted an identifying positional reference from its corresponding calibration NFC chip, and this information has been transmitted to the central processor 22, the calibration phase 205 is complete.

It is noted that no connection with the remote server is required to carry out the above-described calibration phase, as all of the necessary data is stored and processed locally by the central processor 22. However, in an alternative embodiment, it would be possible for the setup identifier 80 to be transmitted from the central processor 22 to the remote server 32 instead, rather than carrying out purely local calibration. The associated system configuration data corresponding to information pieces (a) to (c), which was previously stored in the database prior to the system being used, would then be retrieved in Step 215, and provided to the central processor 22, which would then initiate the start-up and initialisation of the relevant NFC devices 30.

Carrying out this calibration phase 205 ensures that the central processor 22 is aware of the location of each NFC device 30 with respect to the layout of the business cards 1 in the printed sheet 10, so that when the step of writing digital data is to be carried out, the central processor 22 knows which of the NFC devices corresponds to which business card in the printed sheet 10, and the required data can therefore be provided to the correct NFC device 30 by the central processor 22.

If the above-described calibration phase was not utilised, the NFC devices 30 would simply be identified by the order in which they were recognised by the system (i.e. the order in which the NFC devices connected to or communicated with the system); the physical locations of the NFC devices (and hence their correspondence to specific business cards within the printed sheet) would not be known.

As the calibration phase allows specific NFC devices to be used for the provision of selected digital data, this advantageously improves the flexibility of the system, as the number and arrangement of business cards (and hence of NFC devices in the digital data writing apparatus) can be easily varied. It should be clear to the skilled person that the calibration phase need only be performed when the system is initialised (e.g. switched on), when the arrangement or layout of the NFC devices is altered, or when new NFC devices are added—once the location of each NFC device is known to the central processor, all printing sheets which utilise that particular layout or arrangement of NFC devices to write digital data to their NFC chips, will be able to be used without needing to re-perform that calibration. However, if the system is re-started, if the number or position of any of the NFC devices is varied, or if any new NFC devices are incorporated into the system, the calibration step will need to be performed again, which may require new setup identifiers (and new calibration sheets) to be generated, before any further printed sheets can be written to.

Once the calibration phase 205 is complete and the location of each of the NFC devices 30 has been determined by the central processor 22, the digital data writing stage of the process is initiated by the provision in Step 225 of a printed sheet 10 to be written to, and the reading in Step 230 of the sheet identifier 12 in the manner described previously (e.g. by scanning a barcode provided on the printed sheet). The sheet identifier 12 is then forwarded in Step 235 by the central processor to the remote server 32 and its associated database 36 via the communications network 34, and the associated digital data is retrieved from the database 36. For example, the sheet identifier 12 is associated with information such as Position A1 of the NFC device 30 and chip 7 corresponds to Data piece 1; Position A2 corresponds to Data piece 2 and so on. This digital data is then provided to the central processor 22, which forwards each piece of digital data to the correct NFC device 30 known to be located in the corresponding position. Each NFC device 30 then writes in Step 240 the digital data to the NFC chip with which it is associated and inductively-coupled.

Once the writing stage is completed, the testing phase 245 begins, where a quality assessment is carried out on the finished product. Each NFC chip 7 is tested in Step 250 to determine whether the write has been successful and if so, whether the NFC chip is active and will be able to provide the digital data to a user device with NFC capabilities. In some embodiments, this test may be carried out by attempting to read the data from each NFC chip 7 using a separate NFC reader device; in other embodiments, the central processor 22 sends a signal to the NFC devices 30 which originally carried out the writing of the digital data, instructing each device to attempt to read the digital data from the corresponding associated NFC chip 7.

In other embodiments, the system is programmed to run simple diagnostics on the NFC chips 7 using open source NFC libraries (such as those found in Python). A simple binary 'pass/fail' response is returned for each NFC chip 7, and this response is subsequently used by the central processor 22 to instruct the projection apparatus 28 which locations on the digital data writing apparatus 24 are to be illuminated in Step 255 and, in relevant embodiments, the colour of illumination that is to be used for each location. The system operator is then able to visually determine which (if any) of the NFC chips 7 have not been written to as intended and therefore which business cards are defective. The system operator may, optionally, make a mark (or otherwise indicate) on the respective portions of the printed sheet 10 which correspond to the defective business cards, and in the subsequent post-production phase 260 where the printed sheets are cut into individual cards, the defective business cards are removed.

In one embodiment, an automatic method for handling writing failures to the NFC chips is envisioned. The information regarding which NFC chips 7 have been determined to be inactive is automatically logged by the central processor 22, transmitted to the remote server 32 and stored in the database 36, together with the digital data that was intended to be written to that NFC chip 7. Once a sufficient number of inactive NFC chips have been logged in this manner by the system 20 (for example, if there are enough NFC chips to populate a new printed sheet, which would equate to 25 NFC chips in the embodiment of FIG. 2), a new sheet identifier associated with this data is automatically generated and a corresponding new printed sheet is produced. This printed sheet will be treated in the same manner as any normal printed sheet (in which the digital data is being written for the first time). The results of the test for each business card 1 are also logged by the central processor 22 and stored in a portion of the database 36 that corresponds to the account of the customer who ordered that business card. This allows for automated monitoring of the failure rates of each type of digital data for every customer so that the system 20 can automatically ensure that a particular customer will be guaranteed to receive the full quota of business cards that they ordered and originally paid for.

Additionally or alternatively, in some embodiments, the system operator or another system user in the post-production phase may check the business cards that have been deemed functional to ensure that sufficient numbers of business cards with the required capabilities and containing the necessary digital data have been produced to fill the client's order.

Many modifications may be made to the above examples without departing from the scope of the present invention as defined in the accompanying claims.

The invention claimed is:

1. A method of writing digital data to a plurality of printed business cards provided in a printed sheet, each business card comprising a wireless communication chip to which the digital data is written, the method comprising:
   determining relevant pieces of digital data corresponding to the printed sheet;
   writing, using a plurality of wireless communication devices, the relevant digital data to each of the wireless communication chips;
   testing each wireless communication chip to determine if there are any inactive wireless communication chips for which the digital data has not been successfully written to the wireless communication chip; and
   enabling positive visual identification of the inactive wireless communication chips by:
      illuminating one or more positions on the printed sheet where an inactive wireless communication chip is located;
      illuminating one or more positions on the printed sheet where an active wireless communication chip is located; or
      illuminating all positions on the printed sheet where a wireless communication chip is located, the illumination type differing between positions with and without an inactive wireless communication chip.

2. The method of claim 1, wherein determining relevant pieces of digital data comprises providing a sheet identifier corresponding to the printed sheet, the sheet identifier being associated with information relating to the digital data that is intended to be written to each wireless communication chip.

3. The method of claim 2, wherein the writing step further comprises:
   transmitting, to a remote server, the sheet identifier;
   retrieving, from the remote server, the pieces of digital data and the identity of the associated business card which corresponds to each piece of digital data; and
   providing each piece of digital data to a respective wireless communication device which has a first location associated with it, the first location corresponding to a second location of an associated wireless communication chip within the printed sheet.

4. The method of claim 1, wherein writing digital data comprises transferring digital data from each wireless communication device to the corresponding wireless communication chip using Near-Field Communication (NFC) technology.

5. The method of claim 1, wherein each wireless communication chip comprises a passive NFC chip or tag, and each wireless communication device comprises an active NFC device.

6. The method of claim 1, wherein each of the wireless communication chips is associated with a unique chip identifier, and wherein the chip identifier is associated, in a database, with the digital data written to the corresponding wireless communication chip for subsequent retrieval.

7. The method of claim 1, wherein enabling positive visual identification of the inactive wireless communication chips comprises illuminating all positions on the printed sheet where a wireless communication chip is located, the illumination type differing between positions with and without an inactive wireless communication chip, including intermittently illuminating positions with an inactive wireless communication chip, and continuously illuminating positions with an active wireless communication chip.

8. The method of claim 1, further comprising, after determining if there are any inactive wireless communication chips, iteratively carrying out the writing and testing steps for each of the inactive wireless communication chips.

9. The method of claim 8, further comprising enabling positive visual identification of those positions on the printed sheet corresponding to any wireless communication chips for which the iterative writing and testing steps are being attempted.

10. The method of claim 8, further comprising determining that a predefined threshold number of failed write attempts has been reached for one or more of the wireless communication chips, and ending the iterative process of writing and testing for the or each of the one or more wireless communication chips for which the predefined threshold number of failed write attempts has been reached.

* * * * *